United States Patent
Mu

(10) Patent No.: US 12,081,489 B2
(45) Date of Patent: Sep. 3, 2024

(54) METHOD FOR DETERMINING PHYSICAL UPLINK CONTROL CHANNEL RESOURCE, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 378 days.

(21) Appl. No.: 17/630,088

(22) PCT Filed: Jul. 30, 2019

(86) PCT No.: PCT/CN2019/098444
§ 371 (c)(1),
(2) Date: Jan. 25, 2022

(87) PCT Pub. No.: WO2021/016888
PCT Pub. Date: Feb. 4, 2021

(65) Prior Publication Data
US 2022/0255705 A1    Aug. 11, 2022

(51) Int. Cl.
| | |
|---|---|
| H04L 5/00 | (2006.01) |
| H04L 1/1812 | (2023.01) |
| H04W 72/02 | (2009.01) |
| H04W 72/0446 | (2023.01) |

(52) U.S. Cl.
CPC .......... *H04L 5/0055* (2013.01); *H04L 1/1812* (2013.01); *H04W 72/02* (2013.01); *H04W 72/0446* (2013.01)

(58) Field of Classification Search
CPC ... H04L 5/0055; H04L 1/1812; H04L 1/1854; H04L 1/1896; H04L 1/1861; H04W 72/02; H04W 72/0446
See application file for complete search history.

(56) References Cited

U.S. PATENT DOCUMENTS

| | | | |
|---|---|---|---|
| 2021/0006318 A1* | 1/2021 | Kim | H04L 1/1867 |
| 2022/0272673 A1* | 8/2022 | Yang | H04L 1/1671 |
| 2022/0361199 A1* | 11/2022 | Yin | H04L 1/1861 |

OTHER PUBLICATIONS

Motorola Mobility "UCI Enhancements for URLLC" 3GPP TSG RAN WG1 Meeting #97 R1-1907242, May 17, 2019, 3 pages.
Huawei "UCI Enhancements for URLLC" 3GPP TSG RAN WG1 Meeting #97 R1-1906058, May 17, 2019, 10 pages.
PCT/CN2019/098444 International Search Report, dated Apr. 24, 2021, 2 pages.

(Continued)

*Primary Examiner* — Afshawn M Towfighi
(74) *Attorney, Agent, or Firm* — Cozen O'Connor

(57) ABSTRACT

The present invention relates to a method for determining a physical uplink control channel (PUCCH) resource, and a storage medium. The method performed by a terminal includes acquiring codebook type indication information of a hybrid automatic repeat request acknowledgement (HARQ-ACK), a codebook type indicated by the codebook type indication information having a corresponding relationship with a PUCCH resource carrying the HARQ-ACK; and determining the PUCCH resource for carrying the HARQ-ACK based on the codebook type indication information.

14 Claims, 7 Drawing Sheets

(56) References Cited

OTHER PUBLICATIONS

European Patent Application No. 19939976.7, Search and Opinion dated Apr. 5, 2023, 8 pages.
Ericsson "UCI Enhancements for NR URLLC" 3GPP TSG RAN WG1 Meeting #97, R1-1900692, May 2019, 11 pages.
OPPO "Summary of offline discussion on UCI enhancements for URLLC" 3GPP TSG RAN WG1 #96, R1-1903794, Mar. 3, 2019, 15 pages.

* cited by examiner

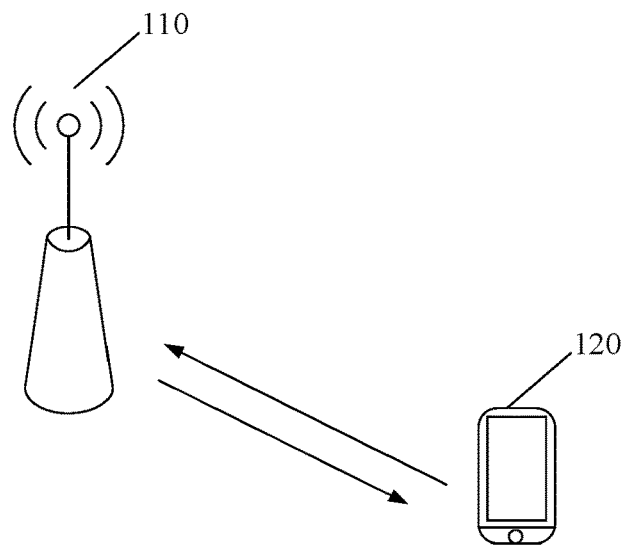

FIG. 1

```
┌─────────────────────────────────────────────┐  S11
│  determining codebook type indication        │
│  information of a HARQ-ACK                   │
└─────────────────────────────────────────────┘
                      │
                      ▼
┌─────────────────────────────────────────────┐  S12
│  sending the codebook type indication        │
│  information                                 │
└─────────────────────────────────────────────┘
```

FIG. 2

```
┌─────────────────────────────────────────────┐  S21
│  acquiring codebook type indication          │
│  information of a HARQ-ACK                   │
└─────────────────────────────────────────────┘
                      │
                      ▼
┌─────────────────────────────────────────────┐  S22
│  determining the PUCCH resource for carrying │
│  the HARQ-ACK based on the codebook type     │
│  indication information                      │
└─────────────────────────────────────────────┘
```

FIG. 3

METHOD FOR DETERMINING PHYSICAL UPLINK CONTROL CHANNEL RESOURCE, AND STORAGE MEDIUM

CROSS-REFERENCE TO RELATED APPLICATIONS

This application is a U.S. national phase of International Application No. PCT/CN2019/098444, filed on Jul. 30, 2019, the entire contents of which are incorporated herein by reference.

TECHNICAL FIELD

The present disclosure relates to a field of communications, and more particularly, to a method for determining a physical uplink control channel (PUCCH) resource, and a storage medium.

BACKGROUND

Hybrid automatic repeat request (HARQ) technology is a universal feedback technique used in wireless communication systems. In HARQ technology, after receiving the physical downlink shared channel (PDSCH) of the downlink service data sent by a network device, a terminal may feed back acknowledgment (ACK) or non-acknowledgement (NACK) information of the PDSCH to assist the network device in determining whether to reschedule the downlink service data or to schedule new downlink service data to the user terminal. The ACK and NACK information are collectively referred to as hybrid automatic repeat request acknowledgment (HARQ-ACK) feedback information.

In the related art, a physical uplink control channel (PUCCH) resource of the HARQ-ACK feedback information is configured for the terminal. The PUCCH resource configured for the terminal may be a PUCCH resource at a slot level or a PUCCH resource at a subslot level. If the terminal is configured with both the slot-level PUCCH resource and the subslot-level PUCCH resource, after the terminal receives the PDSCH of the downlink service data, terminal must determine what level of PUCCH resource should be used for the HARQ-ACK feedback information of the PDSCH.

SUMMARY

According to a first aspect of embodiments of the disclosure, a method for determining a PUCCH resource applied to a terminal is provided. The method includes: acquiring codebook type indication information of a hybrid automatic repeat request acknowledgement (HARQ-ACK), a codebook type indicated by the codebook type indication information having a corresponding relationship with a PUCCH resource carrying the HARQ-ACK; and determining the PUCCH resource for carrying the HARQ-ACK based on the codebook type indication information.

In an implementation, the codebook type indicated by the codebook type indication information is a low-priority codebook type, the PUCCH resource carrying the HARQ-ACK is a slot-level PUCCH resource.

The method provided in the present disclosure further includes: acquiring downlink control information (DCI) scheduling a physical downlink shared channel (PDSCH) corresponding to the HARQ-ACK, the DCI includes a first PUCCH resource identifier and a first interval in units of slots. Determining the PUCCH resource for carrying the HARQ-ACK includes: determining a slot-level PUCCH resource carrying the HARQ-ACK based on the first PUCCH resource identifier and the first interval.

In another implementation, the codebook type indicated by the codebook type indication information is a high-priority codebook type, the PUCCH resource carrying the HARQ-ACK is a subslot-level PUCCH resource.

The method provided in the present disclosure further includes: acquiring DCI scheduling a PDSCH corresponding to the HARQ-ACK, the DCI includes a second PUCCH resource identifier and a second interval in units of subslots. Determining the PUCCH resource for carrying the HARQ-ACK includes: determining a subslot-level PUCCH resource carrying the HARQ-ACK based on the second PUCCH resource identifier and the second interval.

In another implementation, the codebook type indication information is attribute information of DCI. The attribute information of the DCI has a corresponding relationship with a low-priority codebook type or a high-priority codebook type.

The attribute information of the DCI includes a combination of one or more of: a DCI format of the DCI, a radio network temporary identity (RNTI) used by the DCI, an information field of the DCI, a control resource set (CORESET) to which a resource occupied by the DCI belongs, and a search space to which the resource occupied by the DCI belongs.

According to a second aspect of embodiments of the disclosure, a method for determining a PUCCH resource applied to a network device is provided. The method includes: determining codebook type indication information of a hybrid automatic repeat request acknowledgement (HARQ-ACK), a codebook type indicated by the codebook type indication information having a corresponding relationship with a PUCCH resource carrying the HARQ-ACK; and sending the codebook type indication information.

In an implementation, the codebook type indicated by the codebook type indication information is a low-priority codebook type, the PUCCH resource carrying the HARQ-ACK is a slot-level PUCCH resource.

The method provided in the present disclosure further includes: sending downlink control information (DCI) scheduling a physical downlink shared channel (PDSCH) corresponding to the HARQ-ACK, the DCI includes a first PUCCH resource identifier and a first interval in units of slots.

In another implementation, the codebook type indicated by the codebook type indication information is a high-priority codebook type, the PUCCH resource carrying the HARQ-ACK is a subslot-level PUCCH resource.

The method provided in the present disclosure further includes: sending DCI scheduling a PDSCH corresponding to the HARQ-ACK, the DCI includes a second PUCCH resource identifier and a second interval in units of subslots.

In yet another implementation, the codebook type indication information is attribute information of DCI. The attribute information of the DCI has a corresponding relationship with a low-priority codebook type or a high-priority codebook type.

The attribute information of the DCI includes a combination of one or more of: a DCI format of the DCI, a radio network temporary identity (RNTI) used by the DCI, an information field of the DCI, a control resource set (CORESET) to which a resource occupied by the DCI belongs, and a search space to which the resource occupied by the DCI belongs.

According to a third aspect of embodiments of the disclosure, an apparatus for determining a PUCCH resource applied to a terminal is provided. The apparatus includes: an acquiring unit, configured to acquire codebook type indication information of a hybrid automatic repeat request acknowledgement (HARQ-ACK), a codebook type indicated by the codebook type indication information having a corresponding relationship with a PUCCH resource carrying the HARQ-ACK; and a processing unit, configured to determine the PUCCH resource for carrying the HARQ-ACK based on the codebook type indication information.

In an implementation, the codebook type indicated by the codebook type indication information is a low-priority codebook type, the PUCCH resource carrying the HARQ-ACK is a slot-level PUCCH resource.

In another implementation, the codebook type indicated by the codebook type indication information is a high-priority codebook type, the PUCCH resource carrying the HARQ-ACK is a subslot-level PUCCH resource.

According to a fourth aspect of embodiments of the disclosure, an apparatus for determining a PUCCH resource applied to a network device is provided. The apparatus includes: a processing unit, configured to determine codebook type indication information of a hybrid automatic repeat request acknowledgement (HARQ-ACK), a codebook type indicated by the codebook type indication information having a corresponding relationship with a PUCCH resource carrying the HARQ-ACK; and a sending unit, configured to send the codebook type indication information.

According to a fifth aspect of embodiments of the disclosure, an apparatus for determining a PUCCH resource applied to a terminal is provided. The apparatus includes: a processor; and a memory for storing instructions executable by the processor. The processor is configured to perform the method for determining a PUCCH resource in the first aspect or in any implementation of the first aspect.

According to a sixth aspect, a non-transitory computer-readable storage medium is provided. When instructions stored in the storage medium are executed by a processor of a mobile terminal, the mobile terminal is caused to perform the method for determining a PUCCH resource in the first aspect or in any implementation of the first aspect.

According to a seventh aspect, an apparatus for determining a PUCCH resource applied to a network device is provided. The apparatus includes: a processor; and a memory for storing instructions executable by the processor. The processor is configured to perform the method for determining a PUCCH resource in the second aspect or in any implementation of the second aspect.

According to an eighth aspect, a non-transitory computer-readable storage medium is provided. When instructions stored in the storage medium are executed by a processor of a network device, the network device is caused to perform the method for determining a PUCCH resource in the second aspect or in any implementation of the second aspect.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the invention.

FIG. 1 is a schematic diagram illustrating a wireless communication system according to some exemplary embodiments of the disclosure.

FIG. 2 is a flow chart illustrating a method for determining a physical uplink control channel (PUCCH) resource according to an exemplary embodiment of the disclosure.

FIG. 3 is a flow chart illustrating a method for determining PUCCH resource according to another exemplary embodiment of the disclosure.

DETAILED DESCRIPTION

Figure 4:
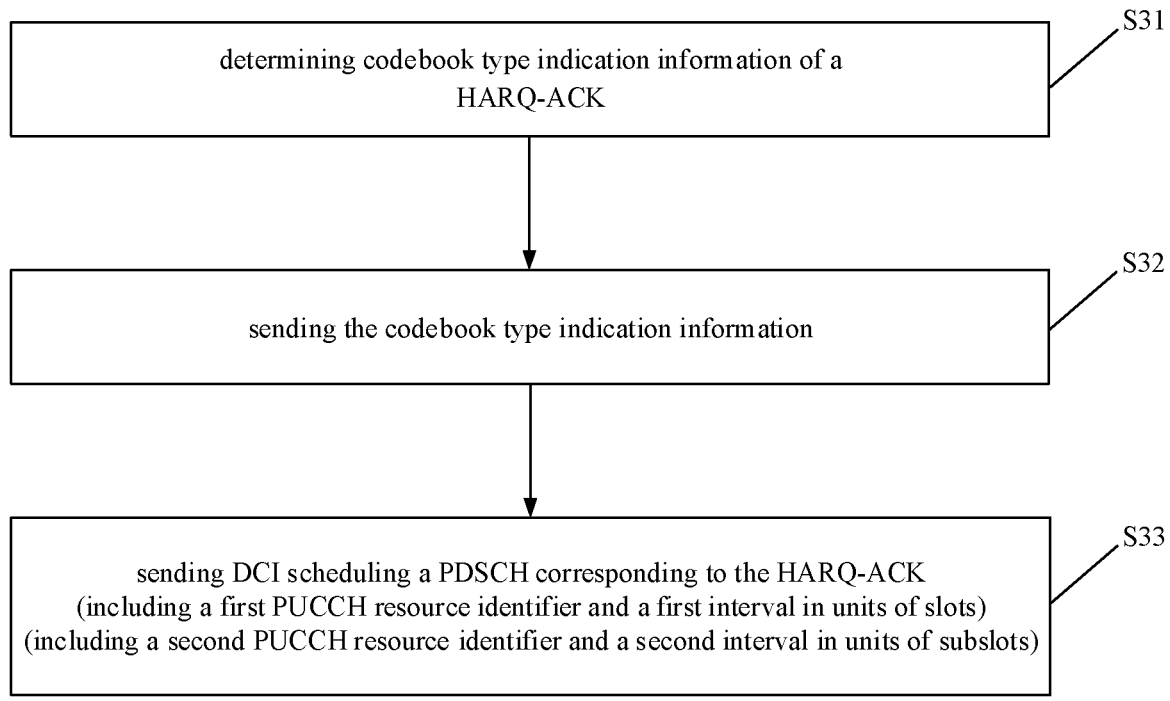
FIG. 4 is a flow chart illustrating a method for determining PUCCH resource according to yet another exemplary embodiment of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure.

The method for determining a physical uplink control channel (PUCCH) resource provided in embodiments of the disclosure may be applied to a wireless communication system 100 shown in FIG. 1. Referring to FIG. 1, the wireless communication system 100 includes a network device 110 and a terminal 120. The terminal 120 is connected to the network device 110 through wireless resources, and transmits and receives data.

It is understood that the wireless communication system 100 shown in FIG. 1 is only for exemplary illustration, and the wireless communication system 100 may also include other network devices, such as a core network device, a wireless relay device, and a wireless backhaul device. etc., not shown in FIG. 1. The embodiments of the present disclosure do not limit the number of network devices and the number of terminals included in the wireless communication system.

It is further understood that the wireless communication system of the embodiments of the present disclosure is a network that provides wireless communication functions. The wireless communication system may use different communication technologies, such as code division multiple access (CDMA), wideband code division multiple access (WCDMA), and time division multiple access (TDMA), frequency division multiple access (FDMA), orthogonal frequency division multiple access (OFDMA), single carrier FDMA (SC-FDMA), carrier sense multiple access with collision avoidance. According to different network capacity, speed, latency and other factors, the network may be divided into 2G (English: generation) network, 3G network, 4G network or future evolution network, such as 5G network. 5G network may also be called a new radio (NR). For the convenience of description, the wireless communication network is sometimes referred to as a network for short in this disclosure.

Further, the network device 110 involved in the present disclosure may also be referred to as a wireless access network device. The wireless access network device may be: a base station, an evolved base station (evolved node B), a home base station, an access point (AP) in a wireless fidelity (WIFI) system, and a wireless relay node, a wireless backhaul node, a transmission point (transmission point, TP), or a transmission and reception point (TRP), etc., may also be a gNB in the NR system, or may also be a component or part of the devices that constitute the base station, etc. When it is a vehicle-to-vehicle (V2X) communication system, the network device may also be a vehicle-mounted device. It should be understood that, in the embodiments of the present disclosure, the specific technology and the specific device form adopted by the network device are not limited.

Further, the terminal 120 involved in the present disclosure may also be referred to as a terminal device, user equipment (UE), a mobile station (MS), a mobile terminal (MT), etc., which is a kind of device that provides user with voice and/or data connectivity. For example, the terminal may be a handheld device with a wireless connection function, a vehicle-mounted device, etc. Currently, some examples of the terminal are: a smart phone (or mobile phone), a pocket personal computer (PPC), a handheld computer, a personal digital assistant (PDA), a notebook computer, a tablet computer, a wearable device, or vehicle equipment, etc. In addition, when it is a V2X communication system, the terminal device may also be a vehicle-mounted device. It should be understood that the embodiments of the present disclosure do not limit the specific technology and the specific device form adopted by the terminal.

In FIG. 1, the terminal 120 communicates with the network device 110, and data sent by the terminal 120 to the network device 110 is called uplink service data, and may be, for example, a physical uplink shared channel (PUSCH). Data sent by the network device 110 to the terminal 120 is called downlink service data, and may be, for example, a physical downlink shared channel (PDSCH). When the terminal 120 and the network device 110 transmit and receive the uplink data and the downlink data, a hybrid automatic repeat request (HARD) feedback technology is adopted to ensure the reliability of transmission. For example, after receiving the PDSCH of the downlink service data sent by the network device 110, the terminal 120 may feed back acknowledgement (ACK) or non-acknowledgement (NACK) feedback information corresponding to the PDSCH, so that the network device 110 can determine whether to reschedule the downlink service data or to schedule new downlink service data to the user terminal. The ACK and NACK feedback information are collectively referred to as hybrid automatic repeat request acknowledgment (HARQ-ACK) feedback information.

In the related art, the terminal 120 is configured with a PUCCH resource of the HARQ-ACK feedback information, and the terminal 120 sends the HARQ-ACK corresponding to the PDSCH on the PUCCH resource. For example, the network device 110 sends downlink control information (DCI) for scheduling a PDSCH to the terminal 120, and the DCI may indicate the PUCCH resource of the HARQ-ACK corresponding to the PDSCH.

In the NR R15 protocol, PUCCH resources are configured according to a slot level. That is, the network device 110 configures multiple PUCCH resources in each slot for the terminal 120, and the PUCCH resource configurations in different slots are the same. There is one HARQ-ACK feedback opportunity in each slot.

In the discussion of NR R16, PUCCH resources are configured according to a subslot level. A slot is divided into multiple subslots, and the configuration of PUCCH resources is configured according to the unit of subslot. That is, multiple PUCCH resources are configured in each subslot. There is one HARQ-ACK feedback opportunity in each sub slot.

In related art, the PUCCH resource is configured for the terminal based on a service type of the downlink service data. For example, in 5G NR, the service type includes an ultra reliable low latency communication (URLLC) service type and an enhance mobile broadband (eMBB) service type. The URLLC service is widely used in 5G scenarios such as factory automation, remote control, and augmented reality/virtual reality (AR/VR), and usually requires very high reliability and very low latency. The eMBB service usually requires a higher rate, but does not require a very low latency and a very low error rate. Therefore, in a case where the terminal 120 is configured with slot-level PUCCH resources and subslot-level PUCCH resources at the same time, when the terminal 120 receives a PDSCH of the eMBB service type, the slot-level PUCCH resources are configured for the HARQ-ACK. When the terminal 120 receives a PDSCH of the URLLC service type, the subslot-level PUCCH resources are configured for the HARQ-ACK.

The way of determining the PUCCH resource of the HARQ-ACK based on the service type has following problems.

In some scenarios, the URLLC service requires extremely low air interface transmission latency. At this time, the URLLC service can only use one-shot transmission (that is, it is only transmitted once, and the single transmission is correct, and there is no need to require the repeat request to ensure reliability). In this case, after the terminal 120 receives the PDSCH of the URLLC service, the HARQ-ACK fed back actually does not require extremely low latency and extremely high reliability. This is because the network device 110 does not wait for the HARQ-ACK feedback to determine whether it needs to retransmit in time. However, the network device 110 still needs the HARQ-ACK feedback information for outer loop power control. The outer loop power control is a slow statistical process that does not require extremely low latency and extremely high reliability.

In other scenarios, the eMBB service may also require high reliability. At this time, it is a better solution for the terminal 120 to put the eMBB PDSCH HARQ-ACK on a PUCCH resource configured at the subslot level for transmission, because the code rate of the PUCCH resource configured at the subslot level is low, thus the reliability is high. The subslot-level PUCCH resource is configured for the URLLC service, and the slot-level PUCCH resource is configured for the eMBB service.

In summary, when both the slot-level PUCCH resource and the subslot-level PUCCH resource are configured for the terminal 120, after the terminal 120 receives the PDSCH of the downlink service data, what level of PUCCH resource is used for the HARQ-ACK feedback information of the PDSCH is a problem that is to be solved.

When the terminal 120 feeds back the HARQ-ACK to the network device 110, decoding results of multiple data transmitted by the network device 110 may be fed back to the network device 110 in one piece of uplink control information (UCI). The decoding results contained in the UCI is called a HARQ feedback codebook. The HARQ feedback codebook is also called a HARQ-ACK codebook. Different HARQ-ACK codebook types indicate different HARQ-ACK priorities. The low-priority codebook type corresponds to the low-priority HARQ-ACK, and the low-priority HARQ-ACK is suitable for the slot-level PUCCH resource. The high-priority codebook type corresponds to the high-priority HARQ-ACK, and the high-priority HARQ-ACK is suitable for the subslot-level PUCCH resource.

In view of this, the present disclosure provides a method for determining a PUCCH resource. In the method, a codebook type of HARQ-ACK is indicated for the terminal, and the codebook type has a corresponding relationship with the PUCCH resource carrying the HARQ-ACK, and then the PUCCH resource used to carry the HARQ-ACK can be determined based on the codebook type indication information of the HARQ-ACK.

FIG. 2 is a flow chart illustrating a method for determining a PUCCH resource according to an exemplary embodiment of the disclosure. As illustrated in FIG. 2, the method for determining a PUCCH resource is used in a network device. The method includes the following.

At step S11, codebook type indication information of a HARQ-ACK is determined.

In the disclosure, when a network device schedules a PDSCH, the network device determines the codebook type of the HARQ-ACK corresponding to the PDSCH, and the codebook type of the HARQ-ACK is indicated in a form of HARQ-ACK codebook type indication information. The codebook type of the HARQ-ACK includes a high-priority codebook type and a low-priority codebook type. The codebook type indicated by the HARQ-ACK codebook type indication information has a corresponding relationship with the PUCCH resource carrying the HARQ-ACK. The HARQ-ACK codebook type is different from the service type. A high-priority service type may correspond to a low-priority HARQ-ACK codebook type, and a low-priority service type may correspond to a high-priority HARQ-ACK codebook type.

On the one hand, when the codebook type indicated by the codebook type indication information is a low-priority codebook type, the corresponding PUCCH resource carrying the HARQ-ACK is a slot-level PUCCH resource. On the other hand, when the codebook type indicated by the codebook type indication information is a high-priority codebook type, the corresponding PUCCH resource carrying the HARQ-ACK is a subslot-level PUCCH resource.

At step S12, the codebook type indication information is sent.

FIG. 3 is a flow chart illustrating a method for determining PUCCH resource according to another exemplary embodiment of the disclosure. As illustrated in FIG. 3, the method for determining a PUCCH resource is used in a terminal. The method includes the following.

At step S21, codebook type indication information of a HARQ-ACK is obtained. A codebook type indicated by the codebook type indication information has a corresponding relationship with a PUCCH resource carrying the HARQ-ACK.

At step S22, the PUCCH resource for carrying the HARQ-ACK is determined based on the codebook type indication information.

In the present disclosure, on the one hand, if the codebook type indicated by the codebook type indication information of the HARQ-ACK acquired by the terminal is a low-priority codebook type, the terminal determines that the PUCCH resource carrying the HARQ-ACK is a slot-level PUCCH resource, and a resource in the slot-level PUCCH resource configuration is used to carry HARQ-ACK feedback information. On the other hand, if the codebook type indicated by the codebook type indication information of the HARQ-ACK acquired by the terminal is a high-priority codebook type, the terminal determines that the PUCCH resource carrying HARQ-ACK is a subslot-level PUCCH resource, and a resource in the subslot-level PUCCH resource configuration is used to carry HARQ-ACK feedback information.

In the embodiments of the present disclosure, the implementation process of determining the PUCCH resource through the codebook type indication information of the HARQ-ACK mentioned above will be described below in combination with practical applications.

Firstly, the above-mentioned codebook type indication information of the HARQ-ACK is described.

In the present disclosure, when the network device schedules the PDSCH, the network device sends the DCI that schedules the PDSCH to the terminal. Therefore, when indicating the HARQ-ACK codebook type corresponding to the PDSCH scheduled by the network device, the HARQ-ACK codebook type may be indicated by using the DCI of the scheduled PDSCH.

In an embodiment, the codebook type indication information of the HARQ-ACK is attribute information of the DCI. That is, the codebook type of the HARQ-ACK is indicated through the attribute information of the DCI. The attribute information of the DCI is a combination of one or more of: a DCI format of the DCI, a radio network temporary identity (RNTI) used by the DCI, an information field of the DCI, a control resource set (CORESET) to which a resource occupied by the DCI belongs, and a search space to which the resource occupied by the DCI belongs.

In the present disclosure, when the codebook type of the HARQ-ACK is indicated by the attribute information of the DCI, the corresponding relationships between the attribute information of the DCI and the codebook types of different levels may be set, and the HARQ-ACK codebook type indication can be realized through the corresponding relationships. The corresponding relationships between the attribute information of the DCI and the codebook types of different levels may be explicit or implicit. In an example, when it is set that the attribute information of the DCI has a corresponding relationship with a high-priority codebook type, other attribute information of the DCI has an implicit corresponding relationship with a low-priority codebook type. Or, when it is set that the attribute information of the DCI has a corresponding relationship with a low-priority codebook type, other attribute information of the DCI has an implicit corresponding relationship with a high-priority codebook type.

The present disclosure will describe indicating the codebook type of the HARQ-ACK through the attribute information DCI with reference to practical applications.

In one aspect, the codebook type of HARQ-ACK is indicated by the DCI format of the DCI in the present disclosure. For example, when there is preset corresponding relationship between a certain set DCI format of DCI and the low-priority codebook type, the set DCI format represents the low-priority codebook type, and DCI formats other than the set DCI format represents the high-priority codebook type. In an example, for a PDSCH corresponding to the high-priority HARQ-ACK codebook type, the network device may use a specific DCI format for scheduling, and for a PDSCH corresponding to the low-priority HARQ-ACK codebook type, the network device may use a DCI format other than the above specific DCI format for scheduling.

In another aspect, in the present disclosure, the RNTI identifier used in the DCI is used to represent the HARQ-ACK codebook type corresponding to the PDSCH scheduled by the DCI. For example, when there is a preset correspondence between an RNTI identifier of a set type used in DCI and the low-priority codebook type, the RNTI identifier of the set type represents the low-priority codebook type, and an RNTI identifier of a type other than the RNTI identifier of the set type represents the high-priority codebook. In an example, modulation and coding scheme (MCS)-RNTI is used in the DCI for dynamically scheduling PDSCH, which represents that the codebook type of the PDSCH scheduled by the DCI is the high-priority HARQ-ACK codebook type, and the terminal maps the HARQ-ACK feedback information corresponding to the PDSCH to the high-priority HARQ-ACK codebook type. If DCI uses an RNTI other than the MCS-RNTI, it means that the codebook type of the PDSCH scheduled by the DCI is a low-priority type, and the terminal maps the HARQ-ACK feedback information corresponding to the PDSCH to the low-priority HARQ-ACK codebook type.

In another aspect, in the present disclosure, a certain information field or a combination of multiple information fields in the DCI is used to represent the HARQ-ACK codebook type corresponding to the PDSCH scheduled by the DCI. For example, when there is a preset correspondence between a set information field value of a certain set information field in the DCI and the low-priority codebook type, the set information field value of the set information field represents the low-priority codebook type, and an information field value other than the set information field value represents the-high priority codebook type. Or, when there is a preset correspondence between set information field values of a certain combination of set information fields in the DCI and the low-priority codebook type, the set state represents the low-priority codebook type, and information field values other than the set information field values represent the-high priority codebook type. For example, there is an information field 1 bit in the DCI, which is used to explicitly indicate the HARQ-ACK codebook type corresponding to the HARQ-ACK information corresponding to the PDSCH dynamically scheduled by the DCI. For example, 1 represents a high-priority HARQ-ACK codebook type, and 0 represents a low-priority HARQ-ACK codebook type.

In another aspect, in the present disclosure, the CORESET/search space to which the DCI belongs is used to indicate the HARQ-ACK codebook type corresponding to the PDSCH scheduled by the DCI. For example, the network device configures a specific CORESET/search for the terminal at the radio resource control (RRC) layer, and there is a preset correspondence between the specific CORESET/search and the high-priority codebook type. Then, when a resource occupied by the DCI belongs to the specific CORESET/search, it represents the high-priority codebook type of DCI scheduling. When the resource occupied by the DCI belongs to a CORESET/search other than the specific CORESET/search, it represents the low-priority codebook type of the DCI scheduling.

In another aspect, in the present disclosure, a combination of multiple of the DCI format of the DCI, the RNTI identifier used in the DCI, the certain information field/the combination of multiple information fields in the DCI, and the CORESET/search space to which the DCI belongs is used to indicate the processing capability applicable to the PDSCH/PUSCH scheduled by the DCI. For example, in the present disclosure, it set that a HARQ-ACK codebook type corresponding to a PDSCH scheduled by DCI with a specific CORESET resource carrier and a specific DCI format is the high-priority codebook type, and the others are the low-priority codebook type. When the resource occupied by the DCI belongs to the specific CORESET, and the DCI format is the specific DCI format, it is determined that the HARQ-ACK codebook type corresponding to the PDSCH scheduled by the DCI is the high priority codebook type. When the resource occupied by the DCI does not belong to the specific CORESET, or the DCI format is not the specific DCI format, it is determined that the HARQ-ACK codebook type corresponding to the PDSCH scheduled by the DCI is the low priority codebook type. For another example, in the present disclosure, it sets a HARQ-ACK codebook type corresponding to a PDSCH scheduled by DCI with a specific RNTI and a specific DCI format is the high-priority codebook type, and the others are the low-priority codebook type. If the DCI uses the specific RNTI and the DCI format is the specific DCI format, the HARQ-ACK codebook type corresponding to the PDSCH scheduled by the DCI is the high priority codebook type. If the RNTI used by the DCI is not the specific RNTI, or the DCI format is not the specific DCI format, the HARQ-ACK codebook type corresponding to the PDSCH scheduled by the DCI is the low priority codebook type. For another example, in the present disclosure, it sets a HARQ-ACK codebook type corresponding to a PDSCH scheduled by DCI with a specific CORESET resource carrier and using a specific RNTI is the high-priority codebook type, and the others are the low-priority codebook type. If the resource occupied by the DCI belongs to the specific CORESET and the specific RNTI is used, the HARQ-ACK codebook type corresponding to the PDSCH scheduled by the DCI is the high priority codebook type. If the resource occupied by the DCI does not belong to the specific CORESET, or the used RNTI is not the specific RNTI, the HARQ-ACK codebook type corresponding to the PDSCH scheduled by the DCI is the low priority codebook type.

Secondly, the present disclosure describes the process of determining PUCCH resources carrying the HARQ-ACK.

FIG. 4 is a flow chart illustrating a method for determining PUCCH resource according to yet another exemplary embodiment of the disclosure. As illustrated in FIG. 4, the method for determining PUCCH resource is used in a network device, and includes the following.

A step S31, codebook type indication information of a HARQ-ACK is determined.

At step S32, the codebook type indication information is sent.

At step S33, DCI scheduling a PDSCH corresponding to the HARQ-ACK is sent.

In the present disclosure, the network device sends the DCI for scheduling the PDSCH to the terminal. The DCI may indicate the PUCCH resource of the HARQ-ACK corresponding to the PDSCH.

The codebook type indicated by the codebook type indication information is a low priority codebook type. On the one hand, the DCI includes an interval between a slot where the PUCCH resource indicating the transmission of the HARQ-ACK is located and a slot where the PDSCH is located, which is hereinafter referred to as the first interval k1. The first interval k1 is in units of slots. For example, if the slot where the PDSCH is located is n, the slot where the HARQ-ACK is located is n+k1. On the other hand, the DCI includes a slot index indicating the PUCCH resource used by the HARQ-ACK, that is, indicating a PUCCH resource identity (ID), which is referred to as the first PUCCH resource ID hereinafter. Each slot is configured with multiple PUCCH resources, and each PUCCH resource has a corresponding first PUCCH resource ID. PUCCH resources on different slots can be indexed by different first PUCCH resource IDs.

The codebook type indicated by the codebook type indication information is a high priority codebook type. On the one hand, the DCI includes the interval between a subslot where the PUCCH resource indicating the transmission of the HARQ-ACK is located and a subslot where the PDSCH is located, which is hereinafter referred to as the second interval k2. The second interval k2 is in units of subslots. For example, if the subslot where the PDSCH is located is n, the subslot where the HARQ-ACK is located is n+k2. On the other hand, the DCI includes a subslot index indicating the PUCCH resource used by HARQ-ACK, that is, indicating a PUCCH resource ID, which is referred to as the second PUCCH resource ID hereinafter. Each subslot is configured with multiple PUCCH resources, and each PUCCH resource has a corresponding second PUCCH resource ID. PUCCH resources on different subslots can be indexed by different second PUCCH resource IDs.

Figure 5:
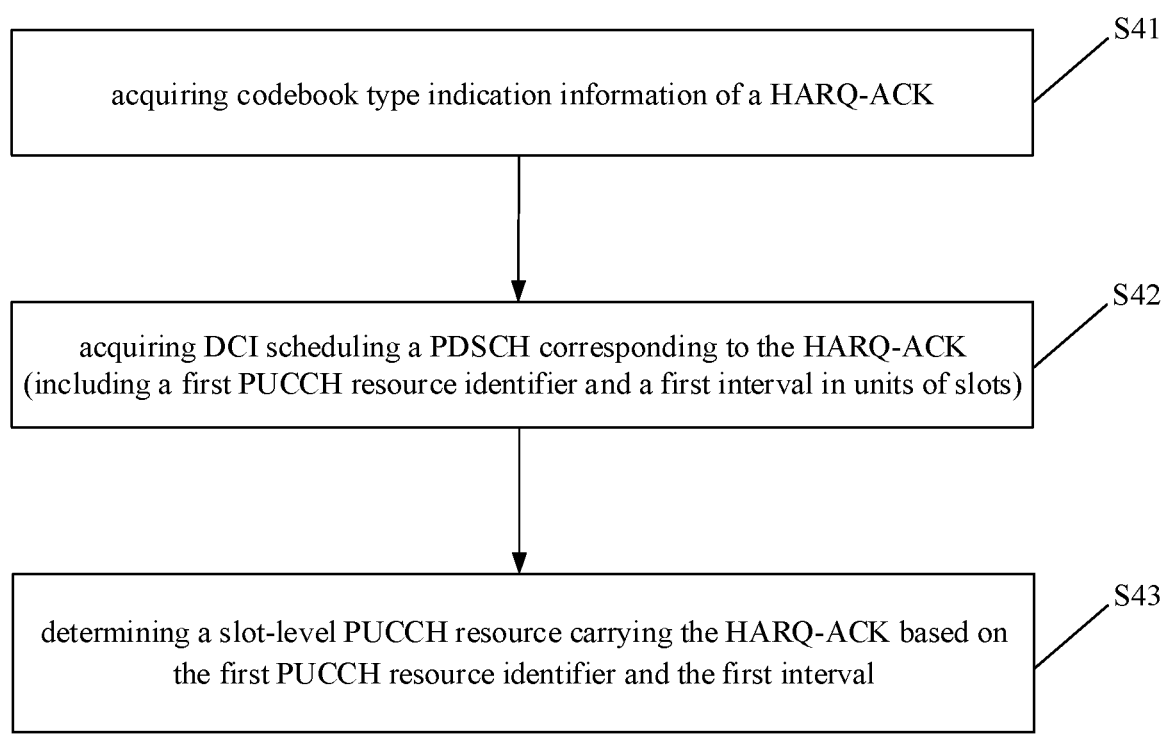
FIG. 5 is a flow chart illustrating a method for determining PUCCH resource according to yet another exemplary embodiment of the disclosure.

FIG. 5 is a flow chart illustrating a method for determining PUCCH resource according to yet another exemplary embodiment of the disclosure. As illustrated in FIG. 5, the method for determining PUCCH resource is used in a terminal, and includes the following.

At step S41, codebook type indication information of a HARQ-ACK is obtained.

In the present disclosure, a codebook type indicated by the codebook type indication information is a low-priority codebook type, and a PUCCH resource carrying the HARQ-ACK is a slot-level PUCCH resource.

At step S42, DCI scheduling a PDSCH corresponding to the HARQ-ACK is obtained.

In the present disclosure, the DCI includes the first PUCCH resource identifier and the first interval in units of slots.

At step S43, a slot-level PUCCH resource carrying the HARQ-ACK is determined based on the first PUCCH resource identifier and the first interval.

Figure 6:
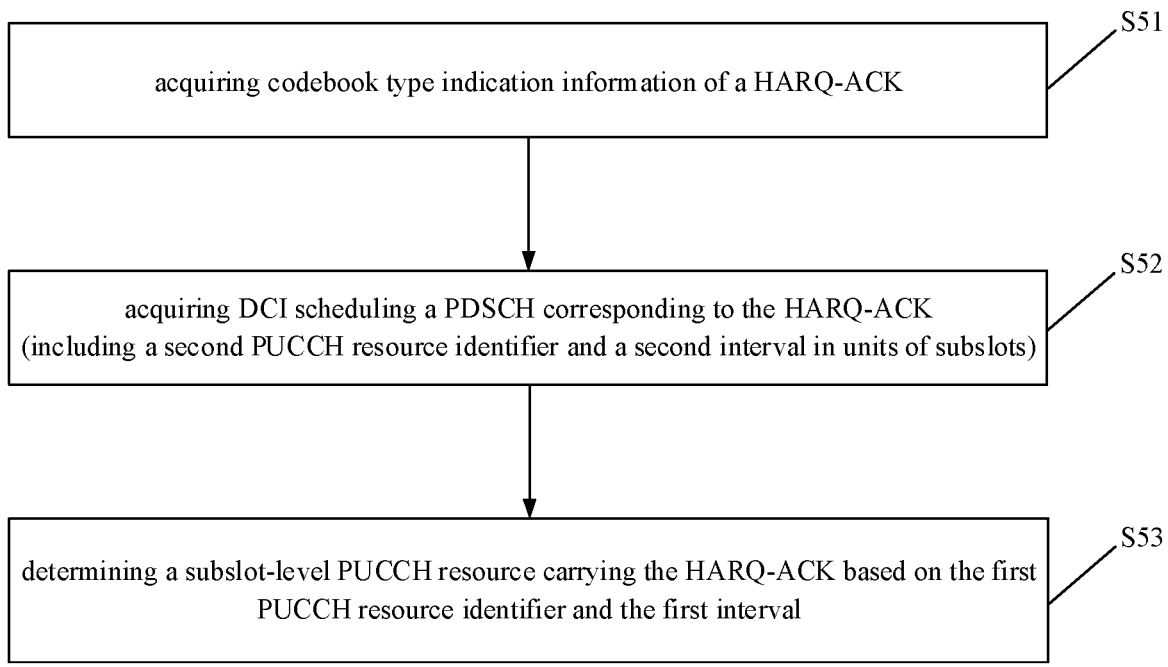
FIG. 6 is a flow chart illustrating a method for determining PUCCH resource according to yet another exemplary embodiment of the disclosure.

FIG. 6 is a flow chart illustrating a method for determining PUCCH resource according to yet another exemplary embodiment of the disclosure. As illustrated in FIG. 6, the method for determining PUCCH resource is used in a terminal, and includes the following.

At step S51, codebook type indication information of a HARQ-ACK is obtained.

In the present disclosure, a codebook type indicated by the codebook type indication information is a high-priority codebook type, and a PUCCH resource carrying the HARQ-ACK is a subslot-level PUCCH resource.

At step S52, DCI scheduling a PDSCH corresponding to the HARQ-ACK is obtained.

In the present disclosure, the DCI includes the second PUCCH resource identifier and the second interval in units of subslots.

At step S53, a subslot-level PUCCH resource carrying the HARQ-ACK is determined based on the second PUCCH resource identifier and the second interval.

With the methods of the present disclosure illustrated in FIG. 5 and FIG. 6, the terminal can determine the PUCCH resource of the corresponding level based on the codebook type indication information and the DCI indication information, so that the terminal can uses the PUCCH resources with a level suitable for the HARQ-ACK feedback information of the PDSCH of the downlink service data after receiving the PDSCH.

Figure 7:
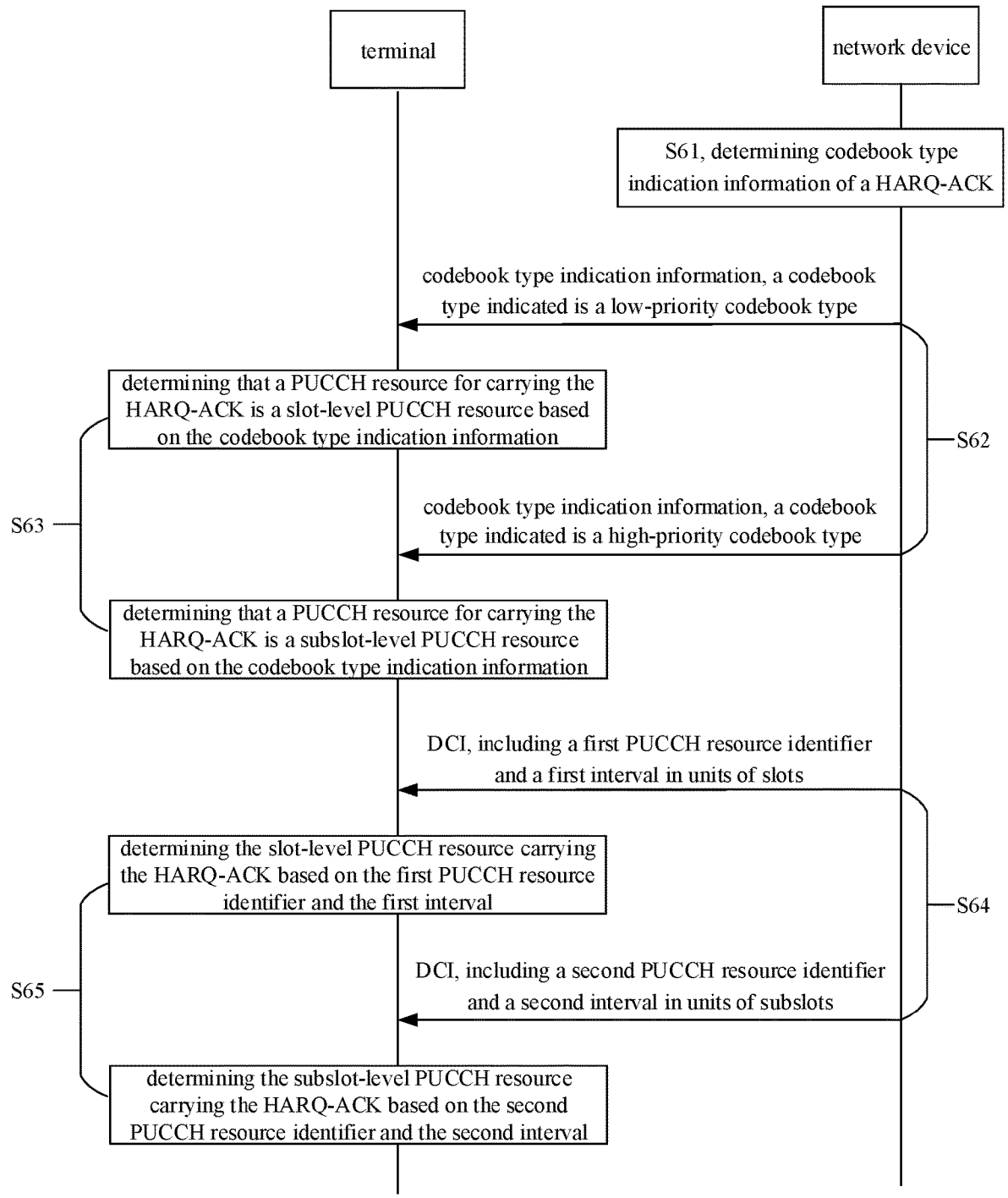
FIG. 7 is a flow chart illustrating a method for determining PUCCH resource according to yet another exemplary embodiment of the disclosure.

FIG. 7 is a flow chart illustrating a method for determining PUCCH resource according to yet another exemplary embodiment of the disclosure. As illustrated in FIG. 7, the method for determining PUCCH resource is used in a process of interaction between a terminal and a network device, and includes the following.

At step S61, the network device determines codebook type indication information of a HARQ-ACK.

A codebook type indicated by the codebook type indication information is a low-priority codebook type or a high-priority codebook type.

At step S62, the network device sends the codebook type indication information. The terminal receives the codebook type indication information sent by the network device.

At step S63, the terminal determines a PUCCH resource for carrying the HARQ-ACK based on the codebook type indication information.

When the codebook type indicated by the codebook type indication information is the low-priority codebook type, it is determined that the PUCCH resource carrying the HARQ-ACK is a slot-level PUCCH resource. When the codebook type indicated by the codebook type indication information is the high-priority codebook type, it is determined that the PUCCH resource carrying the HARQ-ACK is a subslot-level PUCCH resource.

At step S64, the network device sends DCI scheduling a PDSCH corresponding to the HARQ-ACK. The terminal receives the DCI sent by the network device.

When the codebook type indicated by the codebook type indication information is the low-priority codebook type, the PUCCH resource carrying the HARQ-ACK is the slot-level PUCCH resource. The DCI includes a first PUCCH resource identifier and a first interval in units of slots.

When the codebook type indicated by the codebook type indication information is the high-priority codebook type, the PUCCH resource carrying the HARQ-ACK is the subslot-level PUCCH resource. The DCI includes a second PUCCH resource identifier and a second interval in units of subslots.

At step S65, the terminal determines the PUCCH resource based on the PUCCH resource identifier and the interval included in the DCI.

When the codebook type indicated by the codebook type indication information is the low-priority codebook type, the PUCCH resource carrying the HARQ-ACK is the slot-level PUCCH resource. The DCI includes the first PUCCH resource identifier and the first interval in units of slots. The terminal determines a slot-level PUCCH resource carrying the HARQ-ACK based on the first PUCCH resource identifier and the first interval.

When the codebook type indicated by the codebook type indication information is the high-priority codebook type, the PUCCH resource carrying the HARQ-ACK is the subslot-level PUCCH resource. The DCI includes the second PUCCH resource identifier and the second interval in units of subslots. The terminal determines a subslot-level PUCCH resource carrying the HARQ-ACK based on the second PUCCH resource identifier and the second interval.

With the method for determining a PUCCH resource provided in the present disclosure, the codebook type indicated by the codebook type indication information has a corresponding relationship with the PUCCH resource carrying HARQ-ACK, and then the PUCCH resource used to carry the HARQ-ACK can be determined based on the codebook type indication information of the HARQ-ACK, and an appropriate PUCCH resource is determined for the HARQ-ACK.

Based on the same concept, embodiments of the present disclosure also provide a PUCCH resource determination apparatus.

It is understood that, in order to realize the above-mentioned functions, the PUCCH resource determination apparatus provided in the embodiments of the present disclosure includes hardware structures and/or software modules corresponding to each function. In combination with the units and algorithm steps of the examples disclosed in the embodiments of the present disclosure, the embodiments of the present disclosure are implemented in the form of hardware or a combination of hardware and computer software. Whether a function is executed by hardware or computer software-driven hardware depends on the specific application and design constraints of the technical solution. Those skilled in the art may use different methods for each specific application to implement the described functions, but such implementation should not be considered as going beyond the scope of the technical solution of the embodiments of the present disclosure.

Figure 8:
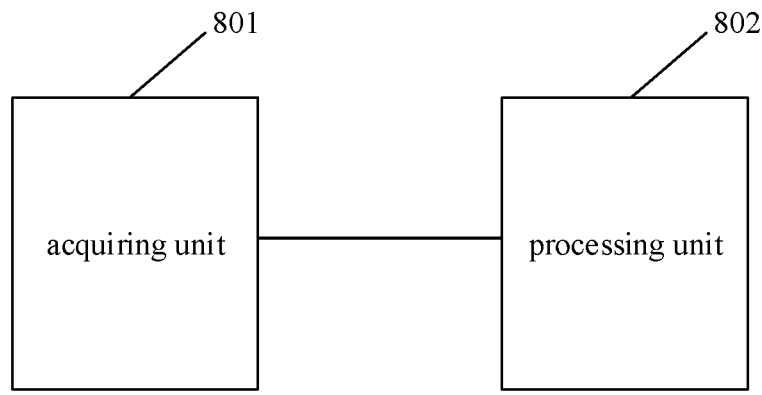
FIG. 8 is a block diagram illustrating an apparatus for determining PUCCH resource according to an exemplary embodiment of the disclosure.

FIG. 8 is a block diagram illustrating an apparatus for determining PUCCH resource according to an exemplary embodiment of the disclosure. As illustrated in FIG. 8, the apparatus 800 is used in a terminal, and includes an acquiring unit 801 and a processing unit 802.

The acquiring unit 801 is configured to acquire codebook type indication information of a hybrid automatic repeat request acknowledgement (HARQ-ACK). A codebook type indicated by the codebook type indication information has a corresponding relationship with a PUCCH resource carrying the HARQ-ACK. The processing unit 802 is configured to determine the PUCCH resource for carrying the HARQ-ACK based on the codebook type indication information.

In an implementation, the codebook type indicated by the codebook type indication information is a low-priority codebook type, the PUCCH resource carrying the HARQ-ACK is a slot-level PUCCH resource.

In another implementation, the acquiring unit 801 is further configured to acquire DCI scheduling a PDSCH corresponding to the HARQ-ACK, the DCI includes a first PUCCH resource identifier and a first interval in units of slots.

The processing unit 802 is further configured to determine a slot-level PUCCH resource carrying the HARQ-ACK based on the first PUCCH resource identifier and the first interval.

In yet another implementation, the codebook type indicated by the codebook type indication information is a high-priority codebook type, the PUCCH resource carrying the HARQ-ACK is a subslot-level PUCCH resource.

In yet another implementation, the acquiring unit 801 is further configured to acquire CI scheduling a PDSCH corresponding to the HARQ-ACK, the DCI includes a second PUCCH resource identifier and a second interval in units of subslots.

The processing unit 802 is further configured to determine a subslot-level PUCCH resource carrying the HARQ-ACK based on the second PUCCH resource identifier and the second interval.

In yet another implementation, the codebook type indication information is attribute information of DCI. The attribute information of the DCI has a corresponding relationship with a low-priority codebook type or a high-priority codebook type.

In yet another implementation, the attribute information of the DCI includes a combination of one or more of: a DCI format of the DCI, an RNTI used by the DCI, an information field of the DCI, a CORESET to which a resource occupied by the DCI belongs, and a search space to which the resource occupied by the DCI belongs.

Figure 9:
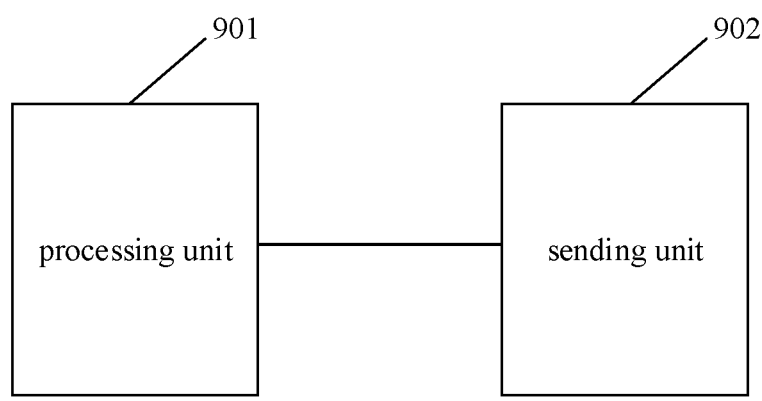
FIG. 9 is a block diagram illustrating an apparatus for determining PUCCH resource according to another exemplary embodiment of the disclosure.

FIG. 9 is a block diagram illustrating an apparatus for determining PUCCH resource according to another exemplary embodiment of the disclosure. As illustrated in FIG. 9, the apparatus 900 is used in a network device, and includes a processing unit 901 and a sending unit 902.

The processing unit 901 is configured to determine codebook type indication information of a hybrid automatic repeat request acknowledgement (HARQ-ACK). A codebook type indicated by the codebook type indication information has a corresponding relationship with a PUCCH resource carrying the HARQ-ACK. The sending unit 902 is configured to send the codebook type indication information.

In another implementation, the codebook type indicated by the codebook type indication information is a low-priority codebook type, the PUCCH resource carrying the HARQ-ACK is a slot-level PUCCH resource.

In another implementation, the sending unit 902 is further configured to send DCI scheduling a PDSCH corresponding to the HARQ-ACK, the DCI includes a first PUCCH resource identifier and a first interval in units of slots.

In yet another implementation, the codebook type indicated by the codebook type indication information is a high-priority codebook type, the PUCCH resource carrying the HARQ-ACK is a subslot-level PUCCH resource.

In yet another implementation, the sending unit 902 is further configured to send DCI scheduling a PDSCH corresponding to the HARQ-ACK, the DCI includes a second PUCCH resource identifier and a second interval in units of subslots.

In yet another implementation, the codebook type indication information is attribute information of DCI. The attribute information of the DCI has a corresponding relationship with a low-priority codebook type or a high-priority codebook type.

In yet another implementation, the attribute information of the DCI includes a combination of one or more of: a DCI format of the DCI, an RNTI used by the DCI, an information field of the DCI, a CORESET to which a resource occupied by the DCI belongs, and a search space to which the resource occupied by the DCI belongs.

Regarding the apparatus in the above embodiments, the specific manner in which each module performs operation has been described in detail in the embodiments of the method, and detailed description will not be given here.

Figure 10:
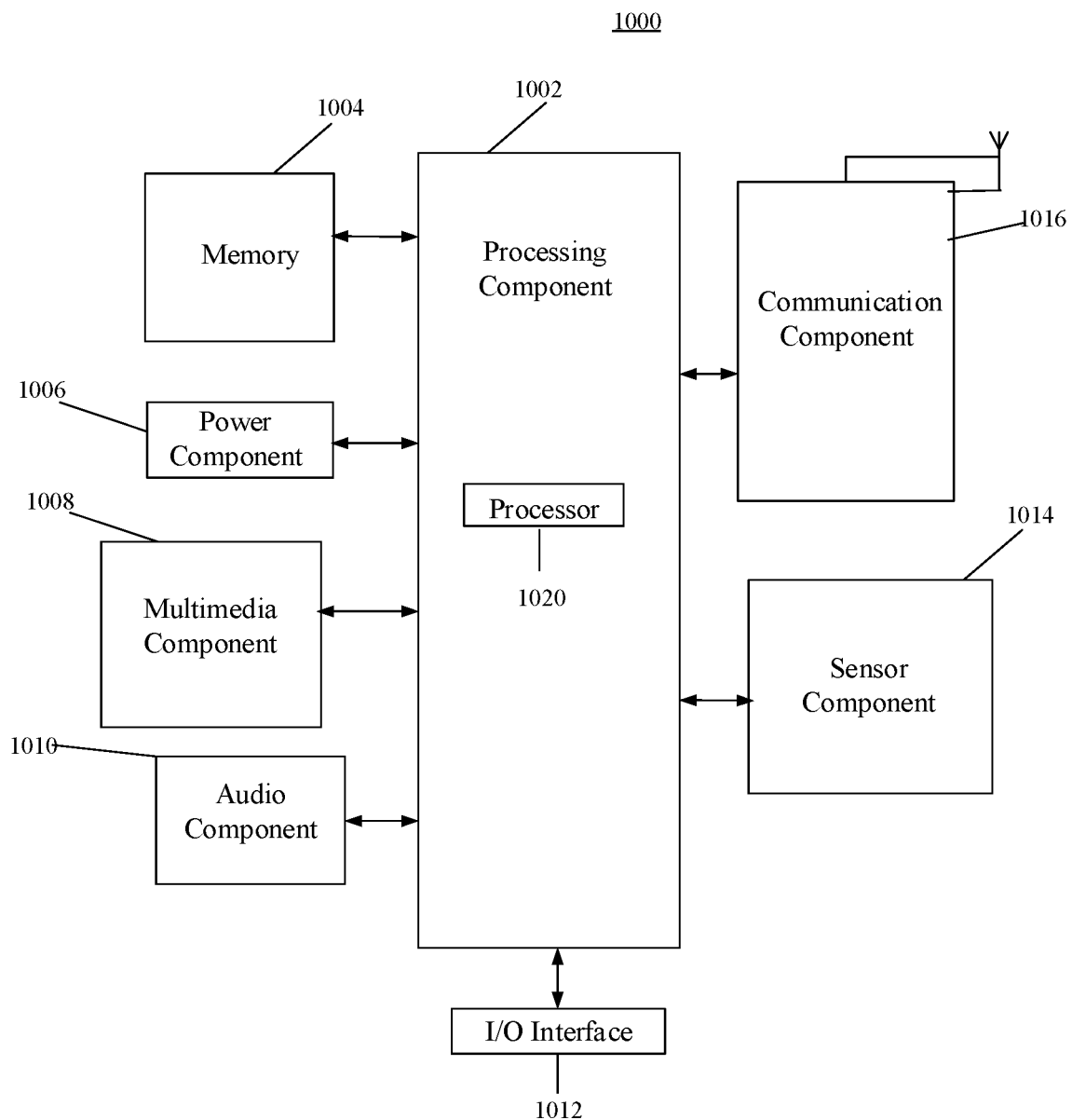
FIG. 10 is a schematic diagram illustrating an apparatus according to an exemplary embodiment of the disclosure.

FIG. 10 is a schematic diagram of an apparatus 1000 for determining a PUCCH resource according to an exemplary embodiment. For example, the apparatus 1000 may be a mobile phone, a computer, a digital broadcast terminal, a messaging device, a gaming console, a tablet, a medical device, exercise equipment, a personal digital assistant, and the like.

Referring to FIG. 10, the apparatus 1000 may include one or more of the following components: a processing component 1002, a memory 1004, a power component 1006, a multimedia component 1008, an audio component 108, an input/output (I/O) interface 1012, a sensor component 1014, and a communication component 1016.

The processing component 1002 typically controls overall operations of the apparatus 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any applications or methods operated on the apparatus 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power management system, one or more power sources, and any other components associated with the generation, management, and distribution of power in the apparatus 1000.

The multimedia component 1008 includes a screen providing an output interface between the apparatus 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the apparatus 1000 is in an operation mode, such as a photographing mode or a video mode. Each of the front camera and the rear camera may be a fixed optical lens system or have focus and optical zoom capability.

The audio component 108 is configured to output and/or input audio signals. For example, the audio component 108 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1016. In some embodiments, the audio component 108 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the apparatus 1000. For instance, the sensor component 1014 may detect an open/closed status of the apparatus 1000, relative positioning of components, e.g., the display and the keypad, of the apparatus 1000, a change in position of the apparatus 1000 or a component of the apparatus 1000, a presence or absence of user contact with the apparatus 1000, an orientation or an acceleration/deceleration of the apparatus 1000, and a change in temperature of the apparatus 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the apparatus 1000 and other devices. The apparatus 1000 can access a wireless network based on a communication standard, such as WiFi, 2G, or 3G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the apparatus 1000, for performing the above-described methods. For example, the non-transitory computer-readable storage medium may be a ROM, a random access memory (SAM), a CD-ROM, a magnetic tape, a floppy disc, an optical data storage device, and the like.

Figure 11:
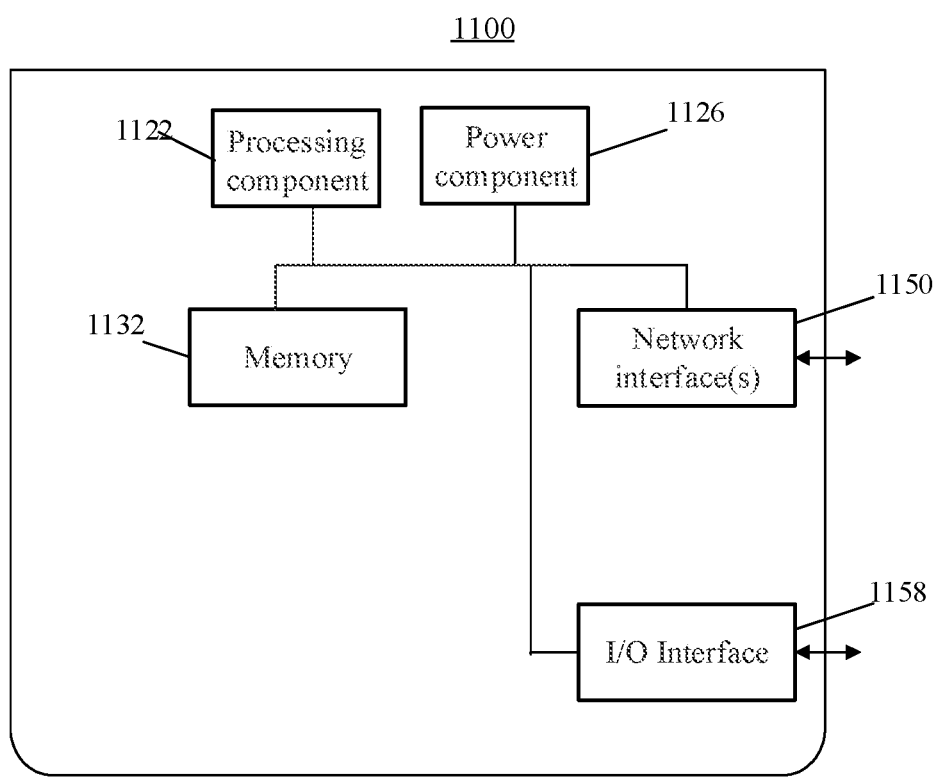
FIG. 11 is a schematic diagram illustrating an apparatus according to an exemplary embodiment of the disclosure.

FIG. 11 is a schematic diagram of an apparatus 1100 for determining a PUCCH resource according to an exemplary embodiment. For example, the apparatus 1100 may be provided as a server. Referring to FIG. 11, the apparatus 1100 may include a processing component 1122 which further includes one or more processors, and memory resources represented by a memory 1132 storing With reference to FIG. 11, the apparatus 1100 may include a processing component 1122 which further includes one or more processors, and memory resources represented by a memory 1132 storing instructions executable by the processing component 1122, such as application programs. The application programs stored in the memory 1132 may include one or more modules each corresponding to a set of instructions. Each module may include a set of instructions for operations on the device 1100. Further, the processing component 1122 may be configured to execute the instructions to perform the foregoing methods.

The apparatus 1100 may also include a power component 1126 configured to implement power management of the apparatus 1100, a wired or wireless network interface 1150 configured to connect the apparatus 1100 to the network, and an I/O interface 1158. The apparatus 1100 may operate based on an operating system 1141 stored in the memory 1132, such as Windows Server™, Mac OS X™, Unix™, Linux™, FreeBSD™, or the like.

It is understood that in the present disclosure, "multiple" refers to two or more, and other quantifiers are similar. In addition, "and/or" in the present disclosure describes a relation of the related objects and indicates that there may be three relations. For example, "A and/or B" indicates three conditions, i.e., A exists alone, A and B exist simultaneously, and B exists alone. The character "/" generally indicates that it is either the former related object or the latter related object. The singular forms "a", "said" and "the" are also intended to include plural forms, unless the context clearly indicates other meanings.

It can be understood that, although the operations are described in a specific order in the drawings in the embodiments of the present disclosure, they should not be understood as requiring these operations to be performed in the specific order shown or in a serial order, or requiring performing all the operations shown in order to get the desired result. In certain circumstances, multitasking and parallel processing may be advantageous.

Other embodiments of the present disclosure will be apparent to those skilled in the art from consideration of the specification and practice of the present disclosure disclosed herein. The present disclosure is intended to cover any variations, uses, or adaptive changes that follow the general principles of the present disclosure and include common general knowledge or customary technical means in the technical field not disclosed in the present disclosure. The specification and embodiments are to be considered exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. The scope of the present disclosure is limited only by the appended claims.

What is claimed is:

1. A method for determining a physical uplink control channel (PUCCH) resource, performed by a terminal, and comprising:
   acquiring codebook type indication information of a hybrid automatic repeat request acknowledgement (HARQ-ACK), wherein a codebook type indicated by the codebook type indication information has a corresponding relationship with a PUCCH resource carrying the HARQ-ACK; and
   determining the PUCCH resource for carrying the HARQ-ACK based on the codebook type indication information;
   wherein the codebook type indicated by the codebook type indication information is a low-priority codebook type, the PUCCH resource carrying the HARQ-ACK is a slot-level PUCCH resource, and the low-priority codebook type is corresponding to an ultra reliable low latency communication (URLLC) service type;
   or,
   the codebook type indicated by the codebook type indication information is a high-priority codebook type, the PUCCH resource carrying the HARQ-ACK is a sub-slot-level PUCCH resource; and the high-priority codebook type is corresponding to an enhance mobile broadband (eMBB) service type.

2. The method as claimed in claim 1, further comprising:
   acquiring downlink control information (DCI) scheduling a physical downlink shared channel (PDSCH) corresponding to the HARQ-ACK, the DCI comprising a first PUCCH resource identifier and a first interval in units of slots;
   wherein determining the PUCCH resource for carrying the HARQ-ACK comprises:
   determining a slot-level PUCCH resource carrying the HARQ-ACK based on the first PUCCH resource identifier and the first interval.

3. The method as claimed in claim 1, further comprising:
   acquiring DCI scheduling a PDSCH corresponding to the HARQ-ACK, the DCI comprising a second PUCCH resource identifier and a second interval in units of subslots;
   wherein determining the PUCCH resource for carrying the HARQ-ACK comprises:
   determining a subslot-level PUCCH resource carrying the HARQ-ACK based on the second PUCCH resource identifier and the second interval.

4. The method as claimed in claim 1, wherein the codebook type indication information is attribute information of DCI;
   the attribute information of the DCI has a corresponding relationship with a low-priority codebook type or a high-priority codebook type.

5. The method as claimed in claim 4, the attribute information of the DCI comprises a combination of one or more of: a DCI format of the DCI, a radio network temporary identity (RNTI) used by the DCI, an information field of the DCI, a control resource set (CORESET) to which a resource occupied by the DCI belongs, and a search space to which the resource occupied by the DCI belongs.

6. A non-transitory computer-readable storage medium, having stored therein instructions that, when executed by a processor of a mobile terminal, cause the mobile terminal to perform the method for determining a PUCCH resource as claimed in claim 1.

7. A method for determining a physical uplink control channel (PUCCH) resource, performed by a network device, and comprising:
   determining codebook type indication information of a hybrid automatic repeat request acknowledgement (HARQ-ACK), wherein a codebook type indicated by the codebook type indication information has a corresponding relationship with a PUCCH resource carrying the HARQ-ACK; and
   sending the codebook type indication information;
   wherein the codebook type indicated by the codebook type indication information is a low-priority codebook type, the PUCCH resource carrying the HARQ-ACK is a slot-level PUCCH resource, and the low-priority codebook type is corresponding to an ultra reliable low latency communication (URLLC) service type;

or, the codebook type indicated by the codebook type indication information is a high-priority codebook type, the PUCCH resource carrying the HARQ-ACK is a sub-slot-level PUCCH resource; and the high-priority codebook type is corresponding to an enhance mobile broadband (eMBB) service type.

8. The method as claimed in claim 7, further comprising:
sending downlink control information (DCI) scheduling a physical downlink shared channel (PDSCH) corresponding to the HARQ-ACK, the DCI comprising a first PUCCH resource identifier and a first interval in units of slots.

9. The method as claimed in claim 7, further comprising:
sending DCI scheduling a PDSCH corresponding to the HARQ-ACK, the DCI comprising a second PUCCH resource identifier and a second interval in units of subslots.

10. The method as claimed in claim 7, wherein the codebook type indication information is attribute information of DCI;
the attribute information of the DCI has a corresponding relationship with a low-priority codebook type or a high-priority codebook type.

11. The method as claimed in claim 10, the attribute information of the DCI comprises a combination of one or more of: a DCI format of the DCI, a radio network temporary identity (RNTI) used by the DCI, an information field of the DCI, a control resource set (CORESET) to which a resource occupied by the DCI belongs, and a search space to which the resource occupied by the DCI belongs.

12. An apparatus for determining PUCCH resource, applied to a network device and implementing the method as claimed in claim 7, and comprising:
a processor; and
a memory for storing instructions executable by the processor;
wherein the processor is configured to perform the steps of the method for determining a PUCCH resource as claimed in claim 7.

13. A non-transitory computer-readable storage medium, having stored therein instructions that, when executed by a processor of a network device, cause the network device to perform the method for determining a PUCCH resource as claimed in claim 7.

14. An apparatus for determining PUCCH resource, applied to a mobile terminal, and comprising:
a processor; and
a memory for storing instructions executable by the processor;
wherein the processor is configured to perform a method for determining a PUCCH resource, the method comprising:
acquiring codebook type indication information of a hybrid automatic repeat request acknowledgement (HARQ-ACK), wherein a codebook type indicated by the codebook type indication information has a corresponding relationship with a PUCCH resource carrying the HARQ-ACK; and
determining the PUCCH resource for carrying the HARQ-ACK based on the codebook type indication information;
wherein the codebook type indicated by the codebook type indication information is a low-priority codebook type, the PUCCH resource carrying the HARQ-ACK is a slot-level PUCCH resource, and the low-priority codebook type is corresponding to an ultra reliable low latency communication (URLLC) service type;

or, the codebook type indicated by the codebook type indication information is a high-priority codebook type, the PUCCH resource carrying the HARQ-ACK is a sub-slot-level PUCCH resource; and the high-priority codebook type is corresponding to an enhance mobile broadband (eMBB) service type.

* * * * *